United States Patent
Sheperek et al.

(10) Patent No.: US 7,097,110 B2
(45) Date of Patent: Aug. 29, 2006

(54) TEMPERATURE COMPENSATION SYSTEMS AND METHODS FOR USE WITH READ/WRITE HEADS IN MAGNETIC STORAGE DEVICES

(75) Inventors: Michael W. Sheperek, Longmont, CO (US); Bryan E. Bloodworth, Irving, TX (US)

(73) Assignee: Texas Instruments Incorporated, Dallas, TX (US)

(*) Notice: Subject to any disclaimer, the term of this patent is extended or adjusted under 35 U.S.C. 154(b) by 0 days.

(21) Appl. No.: 10/736,661

(22) Filed: Dec. 16, 2003

(65) Prior Publication Data

US 2005/0129090 A1 Jun. 16, 2005

Related U.S. Application Data

(60) Provisional application No. 60/499,678, filed on Sep. 2, 2003.

(51) Int. Cl.
*F24F 11/53* (2006.01)
*G01J 5/00* (2006.01)
*G01K 5/00* (2006.01)
*H01C 7/06* (2006.01)
*G11B 5/03* (2006.01)

(52) U.S. Cl. .............. 236/1 C; 374/132; 374/185; 338/8; 338/9; 360/66

(58) Field of Classification Search .............. 236/1 C; 365/211; 374/132, 185; 338/7, 8, 9, 20, 338/25; 360/46, 66, 67
See application file for complete search history.

(56) References Cited

U.S. PATENT DOCUMENTS

| | | | |
|---|---|---|---|
| 5,732,215 A * | 3/1998 | Boutaghou et al. | 710/74 |
| 5,978,163 A * | 11/1999 | Cunningham | 360/66 |
| 6,266,203 B1 * | 7/2001 | Street et al. | 360/69 |
| 6,282,038 B1 * | 8/2001 | Bonaccio et al. | 360/46 |
| 6,433,310 B1 * | 8/2002 | Wickramasinghe et al. | 219/216 |
| 6,452,735 B1 | 9/2002 | Egan et al. | |
| 6,504,662 B1 | 1/2003 | Sobey | |
| 6,757,235 B1 * | 6/2004 | Wickramasinghe et al. | 369/99 |
| 2004/0125857 A1 * | 7/2004 | Sprock et al. | 374/185 |
| 2004/0179414 A1 * | 9/2004 | Hsu | 365/211 |

* cited by examiner

*Primary Examiner*—Marc Norman
(74) *Attorney, Agent, or Firm*—W. James Brady, III; Frederick J. Telecky, Jr.

(57) ABSTRACT

Disclosed herein are methods and systems for sensing and controlling the temperature of a resistive element configured for use in a read/write head of a magnetic data storage device. In one embodiment, a method includes detecting a voltage across the resistive element, where the voltage varies as a function of a temperature of the resistive element. The method also includes comparing the voltage to a predetermined value to determine a variation of the voltage from the predetermined value, and then altering a power applied to the resistive element based on the variation. In this exemplary embodiment, the temperature of the resistive element is then controlled as a function of the altered applied power.

24 Claims, 3 Drawing Sheets

TEMPERATURE COMPENSATION SYSTEMS AND METHODS FOR USE WITH READ/WRITE HEADS IN MAGNETIC STORAGE DEVICES

RELATED APPLICATION

This application claims priority under 35 USC § 119(e)(1) of provisional application Ser. No. 60/499,678, filed Sep. 2, 2003.

TECHNICAL FIELD

Disclosed embodiments herein relate generally to read/write heads in magnetic storage devices, and more particularly to temperature compensation systems and methods for use with such read/write heads to sense and regulate the temperature of resistive elements within the read/write heads.

BACKGROUND

With mass data storage currently falling into the terabyte range, mass data storage devices have become increasingly employed in computers and large data storage systems. Also due to the increasing amount of data to be stored, data read and write speeds have necessarily had to be improved. Such mass data storage devices include tape drives, as well as hard disk drives that have one or more spinning magnetic disks onto which data is recorded for storage and subsequent retrieval. Hard disk drives may be used in many applications, including personal computers, servers, databases, television set-top boxes, and other audio, video, or television applications.

Looking more particularly at hard disk drive systems, the disk drives included therein typically include rotating magnetic disks on which information is magnetically recorded. A head having transducers therein is movably supported adjacent the magnetic disk for reading and writing the information to and from the disks. The head typically flies above the surface of the disk so that it does not touch the surface of the disk during normal operation. Recently, magneto-resistive (MR) transducers have gained wide popularity for use on such read/write heads. The term "magneto-resistance" refers to the change in resistivity of the materials of the transducer in the presence of a magnetic field induced in the transducer by the magnetic domains recorded on the disk. The introduction of MR heads (or other appropriate materials) into disk drives has significantly increased the overall density of hard disk drive systems.

During both the read and write processes, the temperature of the read/write heads typically changes. As their temperature increases, the materials comprising the read/write transducers tend to expand, causing the head to extend towards the disk media, so-called pole-tip-protrusion (PTP). As the distance between the head and the disk media (i.e., the fly height) changes, so too does the bite-error rate (BER) of the data writing or reading operation. Typically, as the heads are positioned closer to the disk media, the BER improves. However, since PTP occurs during operation, the heads cannot be placed at the least distance from the disk media, lest they collide with the disk media as they heat-up during use. As a result, fly height control (FHC) has been developed to dynamically alter the fly height of the heads during operation, in response to detected changes in temperature, by altering the power supplied to various temperature-sensitive components in the head. Unfortunately, conventional techniques employed to detect the temperature on which the FHC is based do not typically give an actual and accurate reading at the most important point in the FHC process, the head-disk interface (HDI).

BRIEF SUMMARY

Disclosed herein are methods and systems for sensing and controlling the temperature of a resistive element configured for use in a read/write head of a magnetic data storage device. As used herein, the term "resistive element" includes any type of transducer material having a voltage drop thereacross based on an applied power, and that may be used for signal reading or writing in the head, or for generating heat in the head, or used exclusively for temperature sensing, such as a thermistor or thermocouple material. In one embodiment, a method includes detecting a voltage across the resistive element, where the voltage varies as a function of a temperature of the resistive element. The method also includes comparing the voltage to a predetermined value to determine a variation of the voltage from the predetermined value, and then altering a power applied to the resistive element based on the variation. The temperature of the resistive element is then controlled as a function of the altered applied power.

In another embodiment, a method includes detecting a voltage across a second resistive element thermally proximate a first resistive element, where the voltage varies as a function of a temperature of the second resistive element. In this embodiment, the method also includes comparing the detected voltage to a predetermined value to determine a variation of the voltage from the predetermined value. The method also includes altering a power applied to the second resistive element based on the variation, where the temperature of the second resistive element varies as a function of the altered applied power. In addition, in this embodiment, the method includes affecting the temperature of the first resistive element with the temperature of the second resistive element due to the thermal proximity of the two elements.

In yet another embodiment, a system for controlling a temperature of a resistive element configured for use in a read/write head of a magnetic data storage device is also disclosed. In an exemplary embodiment, the system comprises a resistive element having a voltage thereacross, where the voltage varies as a function of a temperature of the resistive element. The system also includes comparison circuitry configured to compare the voltage across the resistive element with a predetermined value, and to generate an error signal based on the comparison. In addition, in this embodiment, the system includes a control compensation module configured to receive the error signal and to alter a power applied to the resistive element based thereon, where the temperature of the resistive element varies as a function of the altered applied power.

BRIEF DESCRIPTION OF THE DRAWINGS

Reference is now made to the following detailed description of the preferred embodiments, taken in conjunction with the accompanying drawings. It is emphasized that various features may not be drawn to scale. In fact, the dimensions of various features may be arbitrarily increased or reduced for clarity of discussion. In addition, it is emphasized that some components may not be illustrated for clarity of discussion. Reference is now made to the following descriptions taken in conjunction with the accompanying drawings, in which.

DETAILED DESCRIPTION OF PREFERRED EMBODIMENTS

Figure 1:
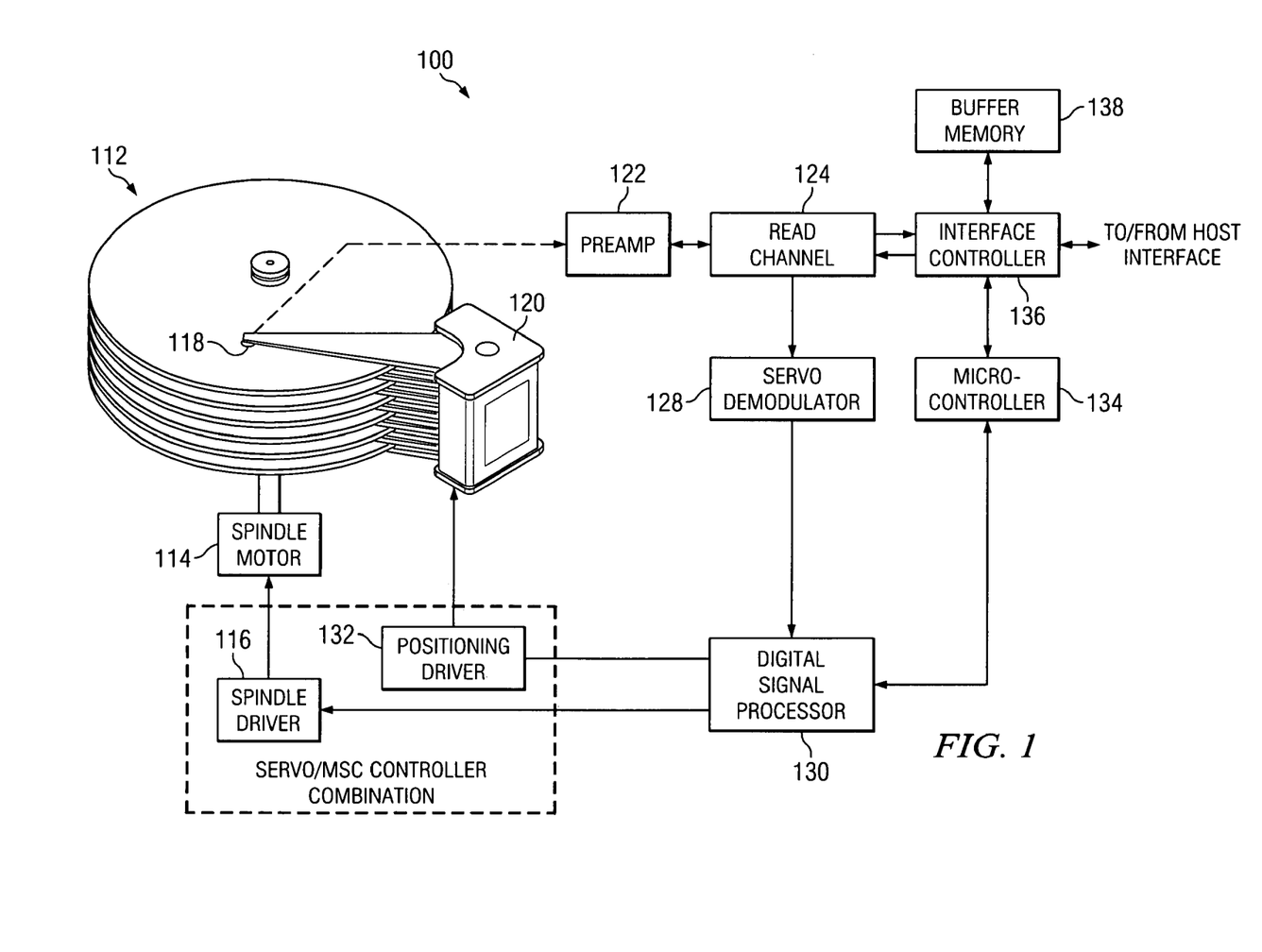
FIG. 1 illustrates a block diagram of a generic disk drive system, which represents one general environment that may incorporate systems and methods according to the principles disclosed herein.

Referring initially to FIG. 1, illustrated is a block diagram of a generic disk drive system 100, which represents one general environment that may incorporate systems and methods according to the principles disclosed herein. The system 100 includes a magnetic media disk stack 112 that is rotated by a spindle motor 114 and spindle driver circuit 116. A data head 118 is locatable along selectable radial tracks (not shown) of the disk stack 112 by a voice coil motor (VCM) 120.

In one embodiment, both sides of each disk in the disk stack 112 are provided with magnetic recording media in the form of an annular pattern of concentric data tracks having an inner diameter and an outer diameter. The radial tracks may contain magnetic states that represent information about the tracks, such as track identification data, location information, synchronization data, as well as user data, and so forth. The head 118, which includes read and write transducers (that may be a magneto-resistive (MR) material), is used to both record user data to and read user data back the disk. The head 118 may also be used to detect signals that identify the tracks and sectors at which data is written, to detect servo bursts that enable the head to be properly laterally aligned with the tracks of the disk, and the like.

To read and write the data, sliders (not separately designated) are moved radially in and out over the disks in the disk stack 112 so that the head(s) 118 may access different portions of the disk surfaces containing the data tracks. Each slider is attached to a corresponding actuator arm by means of a respective suspension and gimbal arrangement. The suspension and gimbal arrangements provide a slight spring force, which biases the sliders towards the disk surfaces with a loading force. Each actuator arm is attached to the VCM 120. The VCM 120 is a coil moveable within a fixed magnetic field. The direction and velocity of the coil movement of the VCM 120 is controlled by the current supplied thereto via the positioning driver 132.

During operation of the disk drive system 100, the rotation of the disks 112 generates an air cushion or "air bearing" between the heads 118 and the disks 112. This air bearing counterbalances the slight spring force of the suspensions and gimbal arrangements, and supports the sliders, and thus the read/write heads 118, above the disk surfaces during operation. MR read/write resistive elements in the head 118 generally include a strip of magneto-resistive material between two magnetic shields. When properly biased, the resistance of the MR material varies almost linearly with an applied magnetic field. During a read operation, the MR strip is positioned above (or below) a desired track, within the varying magnetic field caused by magnetic transitions on the track, and a constant bias current is passed through the strip. By Ohm's law (V=IR), the variable resistance and the constant bias current of the MR strip result in a variable voltage across the MR strip that is proportional to the variable resistance. That is, as set forth in equation (1):

$$V+\Delta V = I(R+\Delta R). \tag{1}$$

Therefore, the variable voltage is representative of the data stored within the desired track. Although embodiments herein are discussed in terms of MR materials in the resistive elements, it should be noted that other materials may also be employed. For example, the resistive elements may comprise materials such as Giant Magneto-Resistive (GMR) material (e.g., comprising NiFe or Fe/Cr), Tunneling Magneto-Resistive (TuMR) material (e.g., comprising PtMN/CoFe/Ru/NiFe), and Current Perpendicular to Plane (CPP) material (e.g., comprising CoFe/NiFe).

In operation, as the disks 112 are rotated, magnetic data is written and read by read/write elements in the head 118. The "readback" signals from the head 118 are analog electrical signals that are generated by the elements in the head 118 in response to the magnetic signals recorded on the disks. The readback signals are amplified by a preamplifier 122 for delivery to read channel circuitry 124, as well as to other components in the system 100.

The preamplifier 122 is also used to read servo signals obtained from the disk surfaces in order to determine the location of the head 118, and to provide information concerning the speed of rotation of the disks in the disk stack 112. The servo signals are detected and demodulated by one or more servo demodulator circuits 128 and processed by a digital signal processor (DSP) 130 to control the position of the head 118 via a positioning driver circuit 132. A microcontroller (e.g., a microprocessor unit) 134 may be provided to control the DSP 130, as well as an interface controller 136 to enable data to be passed to and from a host interface (not shown), such as a personal computer hosting the disk drive system 100. A data memory 138 may also be provided, if desired, to buffer data being written to and read from a disk 112.

Figure 2:
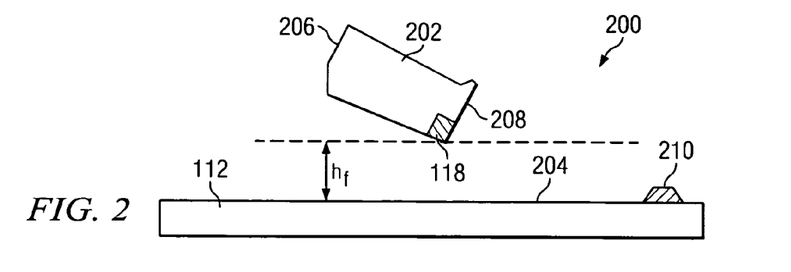
FIG. 2 illustrates a block diagram of an air bearing surface of a read/write head, such as the head illustrated in FIG. 1.

Looking now at FIG. 2, illustrated is a simplified representation of a cross-sectional view 200 of an air bearing slider 202 that includes the head 118 illustrated in FIG. 1 flying above a disk surface 204 of a magnetic storage disk 112. The slider 202 is located at the distal end (opposite the VCM) of the actuator arm assembly (see FIG. 1). The slider 202 includes a leading edge 206 and a trailing edge 208. As illustrated, the head 118 is located proximate the trailing edge 208 of the slider 202.

During operation of the disk drive system, the disk 112 is rotated in the direction of arrow A, from the leading edge 206 to the trailing edge 208. The slider 202 is aerodynamically designed so that when the disk 112 revolves at its normal operating speed, a small cushion of air between the slider 202 and the disk surface 204 lifts the slider 202 (and thus the head 118) a predetermined distance above the disk surface 204. The distance between the head 118 and the disk surface 204 is known as the fly height ($h_f$) of the head 118. The performance of the disk drive depends, to a large extent, on whether the fly height of the head 118 stays within a predetermined fly height range. For instance, if the fly height of head 118 is too low, then the head 118 might crash, engage in excessive contact with the disk surface 204 resulting in damage to the head 118 and/or disk 112, or accumulate excessive debris or lubricant from the disk surface 204. On the other hand, if the fly height of head 118 is too high, then data errors might occur during read and write operations, thus reducing the bit error rate (BER) of the disk drive. More particularly, if the head 118 flies too high during a read operation, then the head 118 might not adequately sense the magnetic polarity transitions on the disk 112. Also, if the head 118 flies too high during a write operation, then the head 118 might not adequately induce the magnetic polarity transitions onto the disk 112. In either case, BER suffers due to improper fly height.

Unwanted changes in fly height may be caused by several factors. In addition to the typical impacts the slider 202 may have with contaminants 210 on the disk surface 204, the simple conduction of the data writing process itself may affect fly height. During writing operations, the temperature of the head 118 typically increases due to the power applied to the write transducer to induce writing on the disk surface 204. More specifically, the read and write transducers in the head 118 each include a specific temperature coefficient (TC). Thus, depending on the temperature coefficient, the temperature of the read and/or write element increases during use, which in turn causes PTP of these elements, resulting in a change in fly height. As mentioned above, unwanted changes in fly height can result in overall performance and/or reliability degradation of the disk drive. This disclosure provides systems and related methods for sensing and controlling the temperature of resistive elements in read/write heads using temperatures detected directly from the HDI, and adjusts the power applied across the resistive read/write elements in order to compensate for such temperature gradients. By adjusting the power applied across these resistive elements, the temperature of these elements may be regulated, and therefore the BER of a read or write operation improved.

Figure 3:
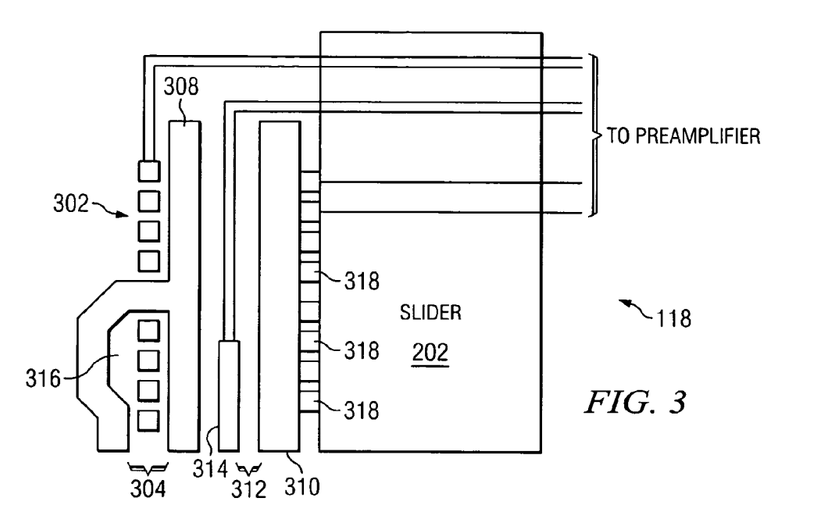
FIG. 3 illustrates a close-up diagram of a combination read/write transducer or head, such as the head illustrated in FIG. 1 and FIG. 2.

Turning now to FIG. 3, illustrated is a close-up diagram of a combination read/write head, such as the head 118 illustrated in FIG. 1 and FIG. 2. As illustrated, the head 118 is mounted on the slider 202 and includes an inductive write element 302, a write gap 304, a first shield 308, a second shield 310, a read gap 312, an MR read element 314, and heater coils 318. Electrical traces from the write element 302, read element 314, and heater coils 318 are also illustrated passing from the read/write head 118 to a preamplifier (not illustrated).

During a read operation, the magnetically-polarized transitions previously written onto the disks of a disk stack are read by the read element 314. The first and second shields 308, 310 form the read gap 312, which serves to focus the flux from the magnetically polarized transitions onto the read element 314 by shielding the read element 314 from other sources of magnetic flux (e.g., sources of magnetic flux not associated with the particular location from which information is being read). Stated another way, the first and second shields 308, 310 shunt extraneous magnetic flux away from the read element 314 as data reading occurs.

During a write operation, variable current is applied to write coils 316 of the write element 302 that induce magnetic flux across the write gap 304 between the write element 302 and the first shield 308. The write element 302 and first shield 308 serve as poles for an electromagnet, which induce the magnetic flux across the write gap 304 that records magnetically polarized transitions on the disks. Furthermore, since the magnetic flux in the write gap 304 has relatively high intensity, and the read element 314 is in close proximity to the write gap 304, a large amount of the magnetic flux across the write gap 304 strikes the read element 314 during a write operation. Consequently, the read element 314 is typically not used to read data from the disks during a write operation.

Also illustrated in the read/write head 118 is a group of heater coils 318. While not necessary to the operation of the head 118, the heater coils 318 provide an independent means by which to regulate the temperature of the head 118 during use. For example, U.S. patent application Ser No. 10/715,217, filed Nov. 17, 2003, and entitled "FLY HEIGHT CONTROL FOR A READ/WRITE HEAD IN A HARD DISK DRIVE," which is commonly owned by the assignee of the present disclosure, discloses the use of such heater coils 318 to regulated the temperatures of elements within the head, in order to address pole-tip-protrusion problems occurring with the head 118 during use. Moreover, these heater coils 318 may be constructed in accordance with the principles herein for use as a sensing device instead of the read or write elements so as to provide the voltage detection described in greater detail below.

Figure 4:
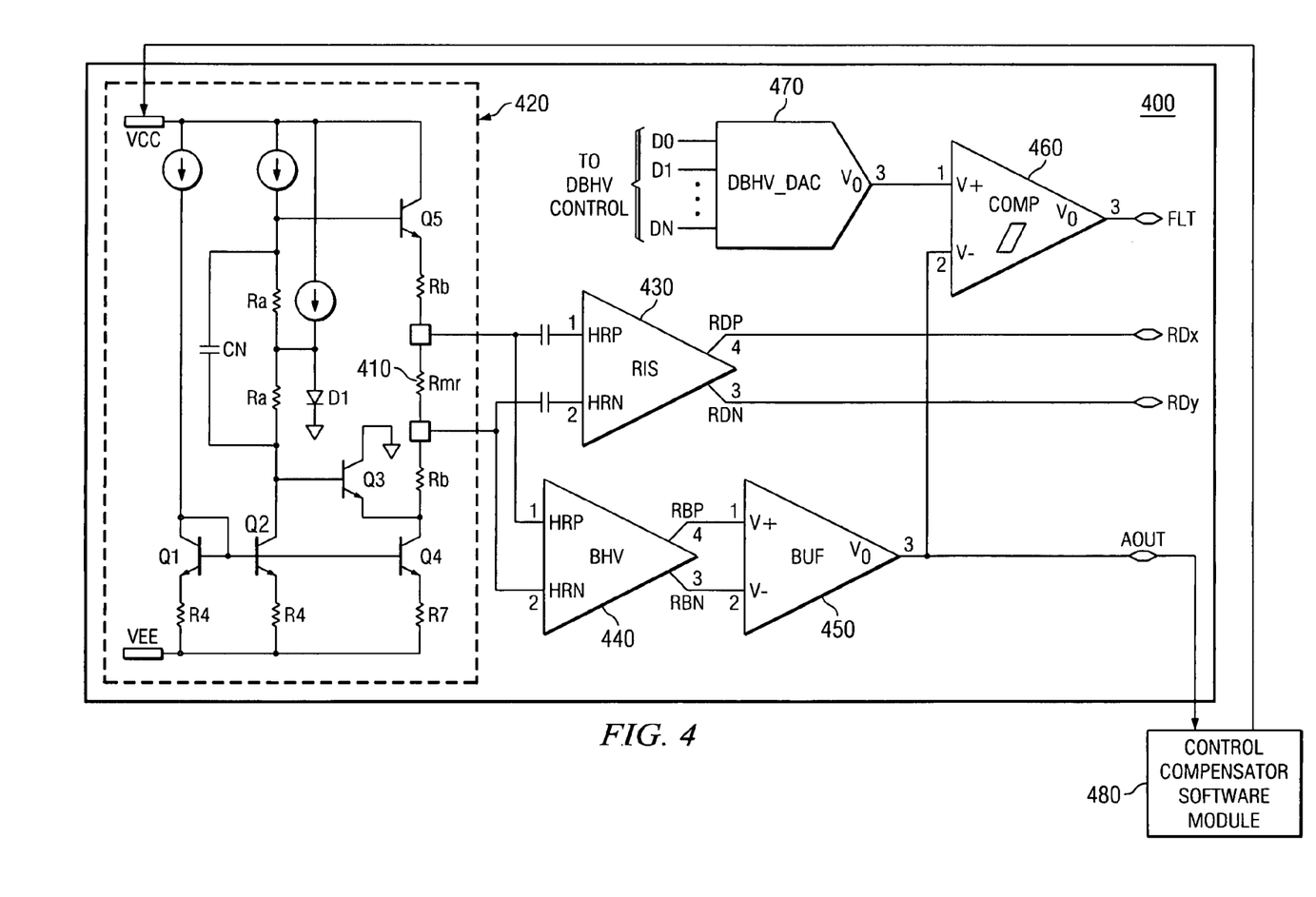
FIG. 4 illustrates a schematic diagram of an exemplary embodiment of a temperature control circuit for use in a system for controlling the temperature of a resistive element used in a read/write head of a magnetic data storage device.

Referring now to FIG. 4, illustrated is a schematic diagram of an exemplary embodiment of a temperature control circuit 400 for use in a system for sensing and controlling the temperature of a resistive element used in a read/write head of a magnetic data storage device. The circuit 400 also illustrates one possible means for implementing a method for sensing and controlling the temperature of a resistive element (e.g., a read or write element/transducer) configured for use in a read/write head. Moreover, a specially selected sensing material or component, e.g., a thermistor or thermocouple material, may also be added to the head and employed exclusively as a temperature sensing component for the systems and methods disclosed, instead of using the read or write transducer, or a heater coil.

Initially, the circuit 400 includes a resistive element 410, which in the illustrated embodiment is an MR element. Of course, other appropriate materials for such a transducer may also be employed. Additionally, the resistive element 410 may be a read transducer or a write transducer located in the head for reading/writing data to a magnetic storage device in the manner described above. Of course, it may also be a specially selected material or component for sensing temperature, as mentioned above. As illustrated, the resistive element 410 may be located within a drive circuit 420 in the preamplifier of a data storage device, which supplies power to the resistive element 410 during a read/write operation. Moreover, the supply of power to the resistive element 410 may be actively altered for FHC of the head, as described above. The drive circuit 420 may be of conventional design and include a number of components for operating elements located in the head. In embodiments where a thermistor or thermocouple material is employed for sensing/controlling temperature, this material would typically not be coupled to the drive circuit and would likely include a separate set of signal connections (not illustrated) for transmitting detected signals across the material.

Coupled across the resistive element 410 are a highpass filter 430 and a lowpass filter 440. In operation, as magnetic signals from the surface of the disk media are detected by the resistive element 410, the resulting voltage change across the resistive element 410 is fed into the highpass and lowpass filters, 430, 440. The highpass filter 430 isolates the relatively high frequency magnetically induced signal (i.e., data signals) of the readback signal from the relatively low frequency thermally induced signals. After the highpass filter 430, the filtered signals that are output from the filter 430 exit the circuit 400 as a first reader output signal ($RD_x$) and a second reader output signal ($RD_y$). The filtered $RD_x$, and $RD_y$ signals are voltage signals that represent the data detected from the surface of the disk media via the resistive element 410, and are transmitted from the preamplifier to other circuitry in the data storage unit, such as a Read Channel or Read Communications Channel, for processing into the retrieved data.

In the lowpass filter 440, the high frequency data signals discussed above are filtered out, leaving a low frequency DC signal. More specifically, conversely to the highpass filter 430, the lowpass filter 440 isolates the relatively low frequency thermally induced signals from the relatively high frequency magnetically induced signal of the readback signal. Preferably, the lowpass filter 440 is designed to have a high-frequency cutoff great enough to transfer thermally induced signals, but lower than the frequency content of the magnetic flux reversals used for writing/reading data to/from the disk media. In other embodiments, bandpass filters may be used instead of lowpass and highpass filters. In specific embodiments, Butterworth-type filters may be employed as an analog filtering technique, however, the steep cut-off features of Butterworth-type filters may also be obtained using digital components and techniques. The frequency response of the filters 430, 440 employed may also be programmable using known analog or digital techniques.

The output of the lowpass filter 440 is fed into an amplifier or buffer 450, which may be employed to impose a gain (typically 10×) on the low frequency DC signal for its use by other components. The gained output of the buffer 450 is input to a comparator 460, along with a signal output from a digitally generated temperature-independent voltage reference 470. The temperature-independent voltage reference 470 is used to establish a reference voltage signal that is temperature independent, and which is input for comparison against the output of the buffer 450. The error signal output from the comparator 460 is fed out of the preamplifier and into other components in the data storage media for further processing, such as digital signal processor (DSP) or a hard disk drive (HDD) controller.

In addition, the output from the buffer 450 is output from the preamplifier as an analog output signal $A_{OUT}$. In accordance with the principles disclosed herein, the filtered low frequency DC voltage signal (e.g., the $A_{OUT}$ signal), which is taken directly from across the resistive element 410, is used to determine the temperature of the resistive element 410, and thus the temperature at the HDI since that is where the resistive element 410 is located. As illustrated, in this exemplary embodiment, the DC signal may be input to a control compensator software module 480 for use in regulating the power applied to the resistive element 410 based on its temperature. Specifically, the resistance (R) of the resistive element 410 changes as its temperature changes during a read/write operation. Using equation (2), which is a variation of Ohm's Law, the software module 480 may be used to calculate the varying resistance of the resistive element 410 based on the $A_{OUT}$ signal and the applied current ($I_{bias}$) across the resistive element 410, which is known. The "10" in equation (2) simply represents a typical gain of imposed by the buffer 450.

$$Rmr = \frac{A_{out}}{(10 \times I_{bias})} \quad (2)$$

To determine the temperature coefficient of the resistive element 410, the initial resistance ($R_O$) and initial temperature ($T_O$) of the resistive element 410 may be employed, along with its operational resistance (R) and temperature (T), all of which may be detected as described above. Once these variables are known, equation (3) may then be employed to calculate the temperature coefficient (TC) of the resistive element 410.

$$TC = \frac{R - R_O}{(T - T_O)R_O} \quad (3)$$

Moreover, the relationship between the temperature of the resistive element 410 and its resistance during operation (Rmr) may be expressed using the temperature coefficient TC found using equation (3). This relationship is set forth in equation (4):

$$Rmr = R_O[1 + TC(T - T_O)]. \quad (4)$$

In exemplary embodiments of the disclosed system, the control compensator software module 480 may be comprised of software code associated with a processor in communication with the magnetic storage device housing the preamplifier circuitry and read/write head. In such embodiments, the code in the software module 480 may be written to perform specific calculations in accordance with the principles disclosed herein. Once any relevant computations are made by the software module 480 based on the thermally-induced low frequency analog signal $A_{OUT}$, the results of those calculations may then be used to adjust the operating temperature of the resistive element 410, and thus compensate for any temperature fluctuations that may cause a reduction in BER. More specifically, the software module 480 alters the power applied across the resistive element 410 based on the detected thermal fluctuations, as shown by the feedback signal illustrated in FIG. 4. By altering the power applied across the resistive element 410, the temperature of the resistive element 410 during operation may be controlled.

As mentioned above, as the power applied across a resistive element increases, so too does the operational temperature of the element. Conversely, as the power across the element is decreased, the temperature across it also decreases. In one embodiment, the software module 480 dynamically alters the current applied to the resistive element 410. For example, voltage may be kept constant in this embodiment while the current across the resistive element 410 is increased, thus increasing the power across the resistive element 410 and its temperature. In another embodiment, the voltage across the resistive element 410 may be decreased to decrease the power applied across the resistive element 410, thus lowering the temperature of the resistive element 410 (in actuality, a temperature increase is substantially curtailed) during operation. As a result, the current and/or voltage across the resistive element 410 may be altered in order to control the power applied to the resistive element 410, and therefore control the operational temperature of the resistive element 410 to maintain an advantageous BER in data reading and writing operation.

In the embodiments discussed above, the resistive element 410 is more often a read element 410. As a result, the detection of the incoming data signals read from the disk media, as well as the thermal signal, may occur at the same time. This is due to the difference in frequency between to the signals, and the use of the highpass and low pass filters 430, 440 to isolate these non-overlapping frequencies. However, in embodiments where the resistive element 410 is a writing element 410, the detection across the writing element 410 may not occur during a write operation. As a result, the detecting across the write element 410 occurs when there is no power applied to the write element 410. When the power is again applied to the write element 410, the power may be altered from the previous application across the write element 410 in accordance with any of the embodiments of the compensation processes disclosed above. In such embodiments, the disclosed system and process may be said to be detecting the fluctuations across the resistive element 410 by "sampling" the voltage signals thereacross at opportune times, rather than continuously. Such an embodiment is discussed in greater detail with reference to FIG. 5.

Figure 5:
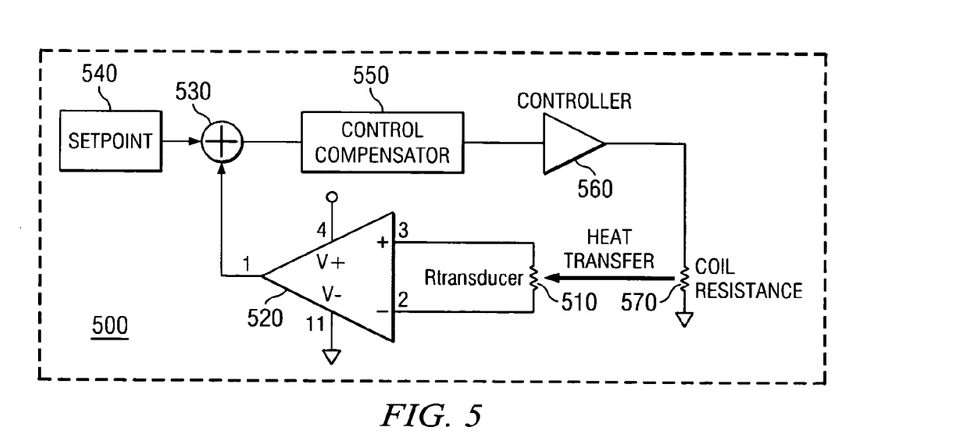
FIG. 5 illustrates a simplified high level block diagram of an exemplary embodiment of a system for controlling the temperature of a resistive element used in a read/write head of a magnetic data storage device.

Looking finally at FIG. 5, illustrated is a simplified high-level block diagram of another exemplary embodiment of a system 500 for controlling the temperature of a resistive element used in a read/write head of a magnetic data storage device. The illustrated system 500 includes circuitry found in a preamplifier, as well as components located in the head of the storage device.

More specifically, the system 500 includes a read element (or transducer) 510, which is used to read data stored on the surface of magnetic disk media in the manner described above. Voltage signals detected across the read transducer 510 are input to a lowpass filter 520 for isolation of the low frequency, thermally induced signals detected across the read transducer 510. The isolated low frequency signal is then input to a summer 530, where it is compared to a predetermined threshold or setpoint 540. Based on the comparison by the summer 530, an error signal is generated and input to control compensator circuitry 550. Contrary to the software module 480, however, the compensator circuitry 550 may be actual circuitry or circuit components located within the magnetic storage device. For example, the compensator circuitry 550 may be constructed using new or existing electrical components found in the preamplifier. In other embodiments, the compensator circuitry 550 may be a specially designed and constructed circuit located somewhere in the magnetic storage device, and associated with the preamplifier.

In a manner similar to that of the software module 480 in FIG. 4, the compensator circuitry 550 receives and processes the error signal to determine if, and by how much, the power across the read transducer 510 should be altered. Once this determination has been made, a controller 560, which may be a DSP, is employed to alter the power applied across a separate resistive element (i.e., the coil resistance 570) located proximate the read transducer 510. As before, the power across the coil resistance 570 may be dynamically fluctuated by altering the current across the coil resistance 570, the voltage thereacross, or both. As the power across the coil resistance 570 is altered, so too is its temperature altered. Due to its proximate location to the read transducer 510, changes in the temperature of the coil resistance 570 may be thermally transferred to the read transducer 510. As a result, the operational temperature of the read transducer 510 may be regulated by proxy, through the use of the coil resistance 570.

In one embodiment, the coil resistance 570 is a heater coil formed in the head of the magnetic storage device, similar to the heater coil 318 discussed with reference to the FIG. 3. However, it should be understood that the coil resistance 570 is not so limited. For example, it is contemplated that the coil resistance 570 may also be a write element located proximate the read transducer 510 to assist in its temperature regulation. Moreover, although the embodiments discussed with respect to FIG. 5 illustrate the read transducer 510 as the read element whose temperature is being regulated, it should be noted that the other types of elements may take the place of the read transducer 510 in the exemplary system 500. For instance, the regulated element may be a write transducer 510, rather than a read transducer. In such embodiments, the coil resistance 570 may again be a heater coil, or it may be a read transducer located proximate the write transducer 510. As a result, the disclosed systems and associated methods, as well as their equivalents, are not limited to any particular types of resistive elements within a read/write head, nor is it limited to the temperature regulation of any particular resistive element.

Although embodiments herein have been described in connection with a hard disk drive, it should be understood that the principles disclosed herein are not limited to such disk drives. Rather, the principles herein are equally applicable to other data storage devices, such as tape drives, employing resistive elements (and similar components) used for writing and reading information to and from a storage media. Furthermore, as mentioned above, the disclosed principles may be used with magnetic storage devices that bias the resistive elements with either a bias current or a bias voltage. In addition, if desired, additional hardware or circuitry may be added to systems and circuits described herein. For instance, control logic may be added that receives warning signals, such as a shock detection signal from a shock sensor, and generates a write unsafe signal (WUS) in response to any such warning signal.

Moreover, while various embodiments of systems and methods for compensating for temperature fluctuations of read/write elements in the data read/write have been described above, it should be understood that they have been presented by way of example only, and not limitation. Thus, the breadth and scope of the invention(s) should not be limited by any of the above-described exemplary embodiments, but should be defined only in accordance with the following claims and their equivalents. Moreover, the above advantages and features are provided in described embodiments, but shall not limit the application of the claims to processes and structures accomplishing any or all of the above advantages.

Additionally, the section headings herein are provided for consistency with the suggestions under 37 CFR 1.77 or otherwise to provide organizational cues. These headings shall not limit or characterize the invention(s) set out in any claims that may issue from this disclosure. Specifically and by way of example, although the headings refer to a "Technical Field," the claims should not be limited by the language chosen under this heading to describe the so-called technical field. Further, a description of a technology in the "Background" is not to be construed as an admission that technology is prior art to any invention(s) in this disclosure. Neither is the "Brief Summary" to be considered as a characterization of the invention(s) set forth in the claims found herein. Furthermore, any reference in this disclosure to "invention" in the singular should not be used to argue that there is only a single point of novelty claimed in this disclosure. Multiple inventions may be set forth according to the limitations of the multiple claims associated with this disclosure, and the claims accordingly define the invention(s), and their equivalents, that are protected thereby. In all instances, the scope of the claims shall be considered on their own merits in light of the specification, but should not be constrained by the headings set forth herein.

What is claimed is:

1. A method of sensing and controlling a temperature of a resistive element configured for use in a read/write head of a magnetic data disk storage device, the method comprising:
   detecting a voltage across the resistive element of said magnetic data disk storage device, the voltage varying as a function of a temperature of the resistive element;
   comparing the voltage to a predetermined value to determine a variation of the voltage from the predetermined value; and
   altering a power applied to the resistive element based on the variation, the temperature of the resistive element varying as a function of the altered applied power.

2. A method according to claim 1, wherein the resistive element is selected from the group consisting of a read transducer, a write transducer, a heating element, and a temperature sensing material.

3. A method according to claim 1, wherein the resistive element comprises material selected from the group consisting of magneto-resistive (MR) material, giant magneto-resistive (GMR) material, tunneling magneto-resistive (TuMR) material, current perpendicular to plane (CPP) material, and temperature sensing material.

4. A method of sensing and controlling a temperature of a resistive element configured for use in a read/write head of a magnetic data storage device, the method comprising:
   detecting a voltage across the resistive element of said magnetic data storage device, the voltage varying as a function of a temperature of the resistive element;
   comparing the voltage to a predetermined value to determine a variation of the voltage from the predetermined value; and
   altering a power applied to the resistive element based on the variation, the temperature of the resistive element varying as a function of the altered applied power,
   wherein detecting a voltage further comprises detecting a voltage across the resistive element using an output of a lowpass filter coupled to the resistive element.

5. A method of sensing and controlling a temperature of a resistive element configured for use in a read/write head of a magnetic data storage device, the method comprising:
   detecting a voltage across the resistive element of said magnetic data storage device, the voltage varying as a function of a temperature of the resistive element;
   comparing the voltage to a predetermined value to determine a variation of the voltage from the predetermined value; and
   altering a power applied to the resistive element based on the variation, the temperature of the resistive element varying as a function of the altered applied power,
   wherein detecting a voltage further comprises detecting a voltage across the resistive element when there is no power applied to the resistive element.

6. A method according to claim 1, wherein altering a power applied to the resistive element comprises altering a voltage applied to the resistive element.

7. A method according to claim 1, wherein altering a power applied to the resistive element comprises altering a current applied to the resistive element.

8. A method of sensing and controlling a temperature of a first resistive element configured for use in a read/write head of a magnetic data storage device, the method comprising:
   detecting a voltage across a second resistive element of said magnetic data disk storage device thermally proximate to the first resistive element, the voltage varying as a function of a temperature of the second resistive element;
   comparing the voltage to a predetermined value to determine a variation of the voltage from the predetermined value;
   altering a power applied to the second resistive element based on the variation, the temperature of the second resistive element varying as a function of the altered applied power; and
   affecting the temperature of the first resistive element with the temperature of the second resistive element due to the thermal proximity.

9. A method according to claim 8, wherein the first resistive element is selected from the group consisting of a read transducer, a write transducer, a heating element, and a temperature sensing material.

10. A method according to claim 8, wherein the second resistive element is selected from the group consisting of a read transducer, a write transducer, a heating element, and a temperature sensing material.

11. A method according to claim 8, wherein the first or second resistive elements comprise material selected from the group consisting of magneto-resistive (MR) material, giant magneto-resistive (GMR) material, tunneling magneto-resistive (TuMR) material, current perpendicular to plane (CPP) material, and temperature sensing material.

12. A method of sensing and controlling a temperature of a first resistive element configured for use in a read/write head of a magnetic data storage device, the method comprising:
   detecting a voltage across a second resistive element of said magnetic data storage device thermally proximate to the first resistive element, the voltage varying as a function of a temperature of the second resistive element;
   comparing the voltage to a predetermined value to determine a variation of the voltage from the predetermined value;
   altering a power applied to the second resistive element based on the variation, the temperature of the second resistive element varying as a function of the altered applied power; and
   affecting the temperature of the first resistive element with the temperature of the second resistive element due to the thermal proximity,
   wherein detecting a voltage further comprises detecting a voltage across the second resistive element using an output of a lowpass filter coupled to the second resistive element.

13. A method of sensing and controlling a temperature of a first resistive element configured for use in a read/write head of a magnetic data storage device, the method comprising:
   detecting a voltage across a second resistive element of said magnetic data storage device thermally proximate to the first resistive element, the voltage varying as a function of a temperature of the second resistive element;
   comparing the voltage to a predetermined value to determine a variation of the voltage from the predetermined value;

altering a power applied to the second resistive element based on the variation, the temperature of the second resistive element varying as a function of the altered applied power; and affecting the temperature of the first resistive element with the temperature of the second resistive element due to the thermal proximity wherein detecting a voltage further comprises detecting a voltage across the second resistive element when there is no power applied to the resistive element.

14. A method according to claim 8, wherein altering a power applied to the second resistive element comprises altering a voltage applied to the second resistive element.

15. A method according to claim 8, wherein altering a power applied to the second resistive element comprises altering a current applied to the second resistive element.

16. A system for sensing and controlling a temperature of a resistive element configured for use in a read/write head of a magnetic data storage device, the system comprising:

a resistive element of said magnetic data disk storage device having a voltage thereacross, the voltage varying as a function of a temperature of the resistive element;

comparison circuitry configured to compare the voltage across the resistive element with a predetermined value, and to generate an error signal based on the comparison; and a control compensation module configured to receive the error signal and to alter a power applied to the resistive element based thereon, the temperature of the resistive element varying as a function of the altered applied power.

17. A system according to claim 16, wherein the resistive element is selected from the group consisting of a read transducer, a write transducer, a heating element, and a temperature sensing material.

18. A system according to claim 16, wherein the resistive element comprises material selected from the group consisting of magneto-resistive (MR) material, giant magneto-resistive (GMR) material, tunneling magneto-resistive (TuMR) material, current perpendicular to plane (CPP) material, and temperature sensing material.

19. A system for sensing and controlling a temperature of a resistive element configured for use in a read/write head of a magnetic data storage device, the system comprising:

a resistive element of said magnetic data storage device having a voltage thereacross, the voltage varying as a function of a temperature of the resistive element;

comparison circuitry configured to compare the voltage across the resistive element with a predetermined value, and to generate an error signal based on the comparison; and a control compensation module configured to receive the error signal and to alter a power applied to the resistive element based thereon, the temperature of the resistive element varying as a function of the altered applied power, further comprising a lowpass filter coupled across the resistive element for detecting the voltage across thereacross by isolating low frequency signals received from the resistive element.

20. A system according to claim 16, wherein the control compensation module is further configured to alter a voltage applied to the resistive element.

21. A system according to claim 16, wherein the control compensation module is further configured to alter a current applied to the resistive element.

22. A system according to claim 16, wherein the control compensation module comprises a control compensation software module.

23. A system according to claim 16, wherein the control compensation module comprises control compensation circuitry.

24. A system according to claim 16, wherein the resistive element is a first resistive element, the system further comprising:

a second resistive element located thermally proximate the first resistive element and having a voltage thereacross, the voltage varying as a function of a temperature of the second resistive element, and wherein the comparison circuitry is configured to compare the voltage across the second resistive element with a predetermined value, and to generate an error signal based on the comparison, and wherein the control compensation module is configured to alter a power applied to the second resistive element based on the comparison, the temperature of the second resistive element varying as a function of the altered applied power and the temperature of the first resistive element varying with the temperature of the second resistive element due to the thermal proximity.

* * * * *